Oct. 12, 1965     W. W. GIBSON     3,211,990
PROGRAMMING SYSTEM FOR A TRANSFORMER POWER SUPPLY APPARATUS
Filed Aug. 9, 1962
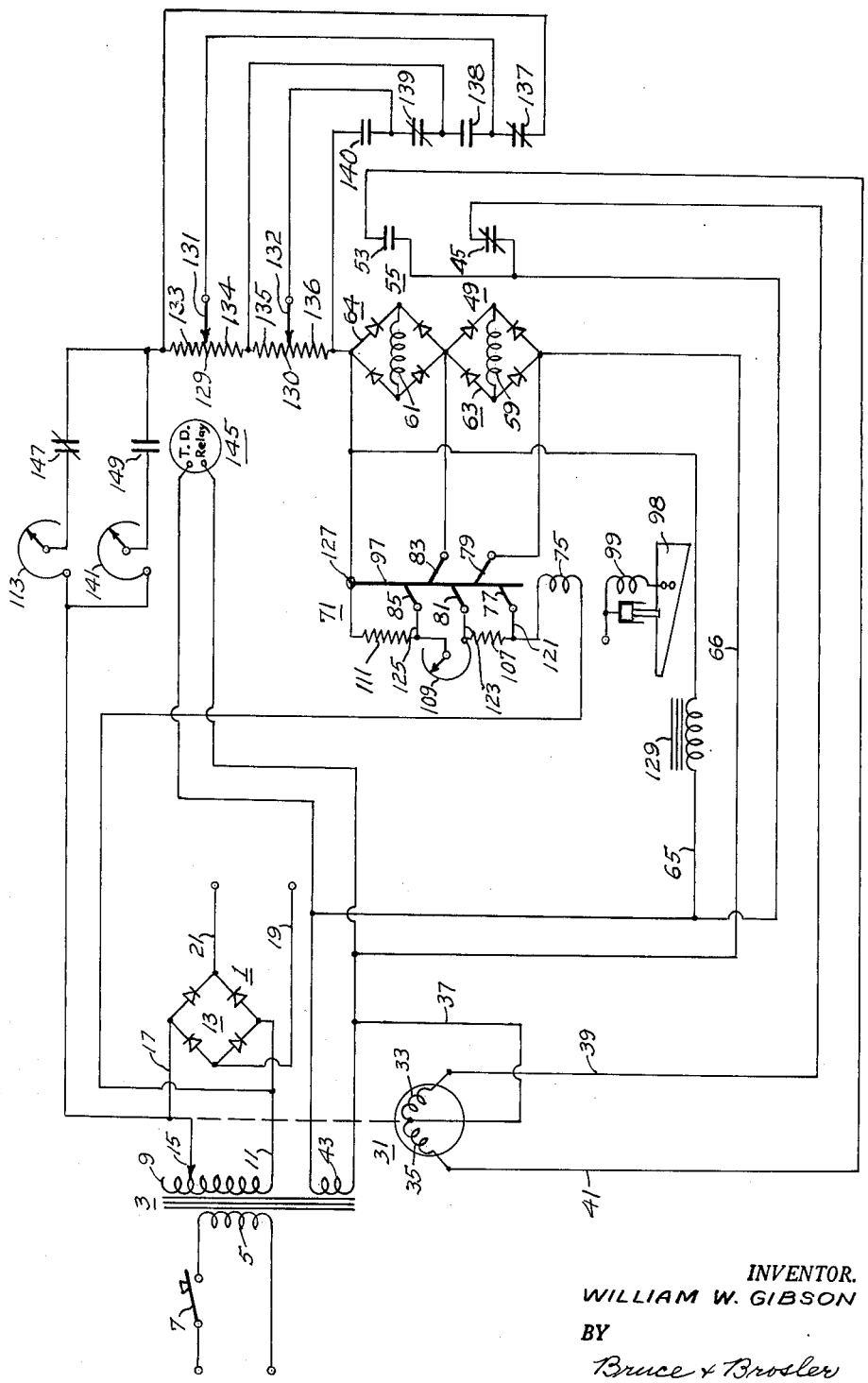
INVENTOR.
WILLIAM W. GIBSON
BY
Bruce & Brosler
HIS ATTORNEYS United States Patent Office 3,211,990
Patented Oct. 12, 1965

3,211,990
PROGRAMMING SYSTEM FOR A TRANSFORMER
POWER SUPPLY APPARATUS
William W. Gibson, Alameda, Calif., assignor to Glenn
Pacific Corporation, a corporation of California
Filed Aug. 9, 1962, Ser. No. 215,891
6 Claims. (Cl. 323—43.5)

My invention relates primarily to the field of automatic electric welding and more particularly to the programming of a repeatable work cycle.

With the demand for refinements in automatic electric welding, comes a requirement for improved means capable of use in establishing and accurately reproducing a work cycle. Such work cycle will necessarily be different to meet different conditions and requirements of welding, and not only must it be possible to pre-establish a desired work cycle, but when once established, the voltage requirements must be maintained against such factors as may tend to undesirably affect them, such as changes in line voltage, random voltage variations as may occur in an average plant, . . . etc.

Among the objects of my invention are:
(1) To provide novel and improved programming means for a power supply source;
(2) To provide novel and improved programming means for a welding power supply;
(3) To provide novel and improved programming means for pre-establishing a welding work cycle;
(4) To provide novel and improved programming means for pre-establishing a welding work cycle, and maintaining such cycle unaffected by factors tending to alter the voltage values involved;
(5) To provide novel and improved programming means for pre-establishing a work cycle and capable of accurately repeating such work cycle.

Additional objects of my invention will be brought out in the following description of a preferred embodiment of the same, taken in conjunction with the accompanying drawings, wherein: The figure is a circuit diagram depicting the application of the present invention to a power supply adaptable for use in welding.

Referring to the drawings for details of my invention in its preferred form, the power supply 1 to which the invention is applied, is depicted basically as involving a main transformer 3 having a primary winding 5 connectible to a source of alternating current through a main switch 7, and a secondary winding 9, with one end thereof connected by a lead 11 to an input corner of a full wave rectifier assembly 13, and an adjustable tap 15 connected by a lead 17 to the opposite corner of the rectifier assembly. The output corners of the rectifier assembly have leads 19 and 21 respectively extending therefrom to provide rectified voltage at values determined by the position of the adjustable contact 15.

Structurally, the adjustable contact may be of the type covered in my pending application for Welding Systems and Associated Adjustable Welding Reactors, Serial No. 763,989, filed September 29, 1958, wherein the contact is in the form of a brush assembly threadedly mounted on a rotatable screw driven by a reversible A.C. motor 31, which may be of the capacitor type, with the brush assembly adapted to traverse an exposed path of travel across the outermost turns of the secondary winding 9.

The motor 31 being of the reversible A.C. capacitor type will have two windings 33 and 35, one for forward drive and the other for reverse drive. A common lead 37 connects to an end of each of the motor windings, while the remaining end of the forward winding 33 has a lead 39 extending therefrom, while a corresponding lead 41 extends from the remaining end of the reversing winding 35.

Power for driving the motor is derived preferably from an independent or auxiliary secondary winding 43 on the core of the main transformer, the common lead 37 of the motor being connected to one side of said secondary winding. The forward winding lead 39 is connected to the other side of the transformer winding 43 through a pair of normally closed relay contacts 45 associated with a direct current relay 49.

The reversing winding 35 is also connected to the opposite side of the independent transformer secondary winding 43, but through a pair of normally open relay contacts 53 associated with a separate direct current relay 55 similar to the other.

Thus, the motor will normally be energized for forward movement, but may be stopped by energization of the first relay, and reversed as to direction by energization of the second relay, while the first relay remains energized.

Therefore, if the forward drive of the motor serves to increase the voltage adjustment of the motor driven contact 15, then reverse rotation of the motor will serve to decrease the voltage adjustment of such contact. In accordance with the present invention, these relays 49 and 55 are controlled to adjust the motor driven contact 15 in accordance with a predetermined work cycle program, and to regulate and stabilize such voltage adjustments during those portions of a work cycle during which they are scheduled to prevail.

Toward this end, each relay winding 59, 61 respectively is connected in its own full wave rectifier bridge 63, 64 respectively, with the windings connected in series across the auxiliary transformer secondary winding 43 by leads 65 and 66.

In association with the relays 49 and 55, means, adapted to regulate against a variable voltage, is employed and made responsive to changing voltage adjustments of the motor driven contact 15 at the main transformer, to control operation of the relays, in such manner as to realize a desired pre-established working cycle program.

Included in such means is a sensitive voltage sensing device, the specific type of voltage sensing device utilized being one available in the form of an electro-mechanical relay 71 having a relay winding 75, and associated therewith, a plurality of mechanically sensitive relay contacts 77, 79, 81, 83, 85 . . . etc., normally engaging a common contact 97 in the form of a rod or bar.

A magnetic element energizable by the coil 75 of the relay, carries a cam 98 of insulation material, so shaped as to sequentially produce separation of the individual contacts 77, 79 . . . etc., with respect to the common contact 97. Such movement of the cam is referenced against the restoring action of an inertia damped spring 99, symbolically illustrated.

An electro-mechanical relay of this type is, at present, available on the market under the trademark "Regohm" and bearing Patent Number 2,550,779.

Such mechanical referencing of the cam element against an inertia damped spring, it will be seen, is of utmost importance to the present invention, the operation of which depends upon the ability to regulate against a variable voltage, namely the changing voltages derived from the main transformer through shifting of the motor driven contact 15 as well as changes due to other causes such as changes in line voltage . . . etc.

In making this electro-mechanical relay responsive to such variable voltage, the relay winding 75 is connected across the input to the full wave rectifier 13 of the power supply unit 1. In effecting such connection, one end of the relay winding 75 may be connected directly to a fixed point such as the end of the main secondary winding 9, while the other end of the relay coil may be connected to the motor driven contact 15, through a series of resistors 107, 109, 111, and 113, the functions of which will be subsequently discussed.

From a point between the relay winding 75 and the first of these series connected resistors 107, a connection 121 is made to the first contact 77 of the plurality of contacts of the relay, while from a point between the first and second resistance, a connection 123 is made to the third contact 81 to thereby short the first resistance 107. A connection 125 to the fifth contact 85 from a point between the second and third resistance, will serve to normally shunt out the second resistance 109. Likewise, a connection 127 to the common contact 97 from a point beyond the third resistance 111 will normally shunt out this latter resistance.

The forward relay 49 with the normally closed pair of contacts 45 in the motor circuit, has its winding 59 normally shorted through the common contact 97 of the electro-mechanical relay, by connecting one side of the winding to the second of the sequentially disengageable contacts, such as contact 79, for example, while the other end of this relay winding is connected to the fourth of the sequentially disengageable contacts, such as contact 83, for example, the important thing, in this regard, being the order of connections with respect to those connections which shunt the series resistors; e.g., that the first connection be to a contact 79 between the shunting contacts 77 and 81 associated with the first of the series resistances 107, while the second connection be to a contact 83 between the contacts 81 and 85 relied on in shunting out the second resistance 109.

In similar manner, the winding 61 of the relay 55 with the normally open pair of contacts 53, is normally shorted through the common contact 97 of the electro-mechanical relay, this being accomplished by a connection from the remote end of such winding to the common contact, it being noted that one end of the winding is already connected to the fourth disengageable contact of the electro-mechanical relay by the previously mentioned connection to contact 83 thereof.

Because of the shorting connections about the relays 49 and 55, a choke 129 is included in the lead 65 to hold currents down to safe values.

Inasmuch as the circuit to the motor 31 is normally closed through the normally closed contacts 45 of the first relay, for forward rotation of the motor, to produce movement of the driven contact 15 in the direction of increasing voltage, the motor will begin operation immediately upon closing of the main switch 7.

Should the winding 75 of the electro-mechanical relay become energized during such operation of the motor, then, insofar as the series connected relays 49 and 55 are concerned, the contact 79 will be disengaged first and thus remove the short from the first of these relays and permit the same to become energized. A result of such energization will be to open the normally closed contacts 45 and thus disconnect the power from the motor and bring it to a stop, along with the contact 15 which is driven thereby.

The time it takes to bring about such disengagement of contact 79 will be a function of the voltage impressed upon the winding 75, and the mechanical resistance offered by the inertia damped spring. Thus, the lower the voltage initially impressed upon the winding, the longer will be the period of operation of the motor in the forward direction.

In this connection, it is noted that the driven contact, in moving to higher values of voltage, will in turn cause the voltage impressed upon the winding of the electro-mechanical relay to correspondingly increase, and as a result, correspondingly increase the rate at which the contacts of the relay will be sequentially disengaged from the common contact.

The second relay of the series, however, will not be energized until the short circuit thereabout is removed, and this can only occur through disengagement of the contact 83. This, in turn, can only occur if the voltage across the relay winding 75 reaches a value sufficient to cause the cam element 98 to produce disengagement of the contact 83, and should this occur, it becomes apparent that not only will the first relay 49 remain energized and thus maintain its contacts 45 open, but the second relay 55 will also become energized and close its contacts 53 to reverse the operation of the drive motor 31 and cause the driven contact 15 to move in the direction of lower voltage values.

Accordingly, so long as contact 79 has been disengaged and contact 83 remains in engagement, the motor will be disconnected from circuit, and of course will not be energized, and the driven contact 15 will remain stationary at its prevailing position.

By adjusting the variable resistor 113, the initial voltage appearing across the electro-mechanical winding, for any particular prevailing position of the motor driven stop 15, will be different. The magnitude of such voltage will determine a different rate curve, in accordance with which the contacts of this relay will be sequentially disengaged from the common contact. Because of such different rates, it will become apparent that the distance which the driven contact will move before the normally closed contacts of the forward relay will open, will vary. It follows from this, therefore, that by varying the adjustable resistor 113, the driven contact may be caused to move to different voltage values on the secondary winding with which it is associated before the relay 49 becomes energized and disconnects the motor 31. Once the driven contact has found its position, it will, in the absence of other factors, tend to hold such position.

However, should the voltage at the contact 15 change appreciably, due to change in line voltage, or for some other reason, a corresponding change in voltage across the coil 75 of the electro-mechanical relay will occur.

Should the change in voltage at the driven contact 15 be in the direction of the higher value, then to regulate such voltage, the contact should move to a lower position. This is automatically taken care of with the system as described, for the corresponding increase in voltage across the winding 75 of the electro-mechanical relay will cause additional contacts to be sequentially disengaged until contact 83 opens and removes the short circuit from the reversing relay 55 whereupon, this relay becomes energized and closes the contacts in the reversing circuit of the motor, to drive the contact 15 in the direction of a lower position. The resulting drop in voltage across the coil 75 of the electro-mechanical relay, will cause the contacts to re-engage the common contact 97 in reverse order, to again short the reversing relay 55 and de-energize the motor. At this point, the driven contact will be at the same voltage though at a lower point on its associated winding, and will remain at this point so long as the line voltage remains at its increased value.

On the other hand, should the line voltage drop substantially, then to maintain proper voltage at the driven contact, it should move to a higher position on the secondary winding of the main transformer. This will automatically occur because the reduction in voltage across the winding of the electro-mechanical relay, due to the drop in line voltage, will cause contact 79 to re-engage the common contact 97 and thus short out the forward relay, permitting its contacts 45 to close and energize the motor to cause elevation of the driven contact. This in turn will increase the voltage across the winding of the electro-mechanical relay, causing contact 79 to disengage and bring the motor to a halt.

The rate curve along which such compensation occurs will depend upon the extent to which the line voltage has changed, and thus the new position of the driven contact will vary accordingly, and in this way, maintain the voltage at the contact substantially constant.

The distance between the contacts 79 and 83 introduces a time element between the disengagement or engagement of the one contact with respect to the other, and insofar as energization of the motor is concerned, represents a dead zone, and any slight or transient change in voltage occurring at the driven contact 15 and which are insufficient to affect the prevailing condition of either contact 79 or contact 83 will accordingly have no effect on the system.

To stabilize the system, and assure with greater certainty that contact 83 will not disengage when it is not supposed to, the first resistance 107, which is shunted by contacts 77 and 81 will, upon disengagemnt of the first contact 77 and in anticipation of disengagement of contact 79, be thrown into circuit with the winding 75 of the electro-mechanical relay and thereby sharply decrease the existing voltage across this winding and ease the operation of the relay into the dead zone region of its operation.

The manually adjustable resistance 109, when it is cut into the circuit of the electro-mechanical relay winding 75 upon disengagement of the third operating contact 81 of said relay, functions to extend the dead zone region of the relay to a degree dependent upon the adjustment of this resistance, whereby the sensitivity of this relay may be controlled.

Resistance 111 will be added to the circuit of the relay winding 75 upon disengagement of the fifth operating contact 85 and function somewhat along the line of resistor 107 as a compensating resistance.

The adjustable resistor 113 in the circuit to the winding of the electro-mechanical relay, provides for operation of the power supply unit at any pre-selected one of a range of voltages, within the limits permitted by the adjustable resistor.

In programming a work cycle however, it quite often becomes necessary to change the operating voltage at some intermediate point in the work cycle, and the present invention permits of such changes.

Toward this end, we connect in parallel with the adjustable resistor 113, an adjustable resistor 141 having a different range of values. Means are then provided for switching from the one resistor 113 to the other 141 at the proper moment in the work cycle, and one way of accomplishing this is to provide a time controlled means, preferably in the form of a time delay relay 145 having normally closed contacts 147 in the circuit of the first adjustable resistor 113, and normally open contacts 149 in the circuit of the second adjustable resistor 141 whereby, upon termination of the time delay period for which the relay is set, the first resistor 113 will be disconnected from the circuit, while the second resistor 141 is inserted in the circuit.

Following insertion of the second resistor, this second resistor, at its pre-set value, will bring about a change in voltage across the winding of the electro-mechanical relay, and cause it to function along a different rate curve and bring about the desired shift in the driven contact 15. Following establishment of the new operating voltage, the system will thereafter function to stabilize operation of the power supply unit at that voltage, in the same manner as previously discussed.

Additional adjustable resistors may be connected in parallel to the others, and with means provided for adding or withdrawing such resistors from the system at proper moments in the operating cycle, any type or character of programming may be established for a work cycle, and such work cycle may be accurately and faithfully repeated.

In making the transition from one voltage to another during an operating cycle, the motor is apt to overshoot and cause hunting about the voltage value to which the system is to adjust. When the excursions die down to within the dead zone region of the electro-mechanical relay, they will stop. However, such hunting is undesirable.

To avoid this, regardless of whether the voltage changes in the direction of decrease or in the direction of a higher value, there is provided in the circuit of the winding 75, a pair of series connected resistors 129, 130, each including an adjustable tap 131 and 132 respectively. The tap 131 divides its resistor into sections 133 and 134, while the tap 132 partitions its resistor into sections 135 and 136.

Forward control relay 49 in addition to its normally closed contacts 45, has a set of normally closed contacts 137 shunting the section 133 of resistor 129, and a pair of normally open contacts 138 connected across section 134 of the same resistor. Therefore, when the relay 49 is de-energized, the resistance section 134 will be in the circuit, whereas when this relay is energized, the resistance section 133 will be in the circuit, to the exclusion of the section 134.

Likewise, relay 55 has, in addition to its normally open contacts, a pair of normally closed contacts 139 and a pair of normally open contacts 140. The normally closed contacts shunt the resistor section 135 out of the circuit of the winding 75 while leaving the resistor section 136 in the circuit. When energized, the relay 55 connects the section 135 into the winding circuit and shunts out the resistor section 136.

These resistors are rate compensating resistors and serve to ease the motor driven contact 15 to its new voltage position without hunting.

If the change is in the direction of a higher voltage, then upon energization of the relay 49, resistor section 133 will be substituted for resistor section 134. By previously adjusting the contact 131 of this resistor so that the resistance of section 133 is greater than the section 134, damping may be effected. The rate of damping will, of course, be a function of the relative magnitudes of the resistor sections obtainable by such adjustment.

If the desired change be in the direction of a lower voltage, then upon energization of the relay 55, the resistor section 135 will be substituted for resistor section 136. By adjusting the associated tap 132 to make section 135 of greater value than section 136, damping may be introduced to prevent hunting. The rate of damping will, like in the preceding instance, be a function of the value of the substituted resistance as compared to the resistance of the section withdrawn from the circuit.

From the foregoing description of my invention, it will be apparent that the same is subject to alteration and modification without departing from the underlying principles involved, and I, accordingly, do not desire to be limited in my protection to the details illustrated and described except as may be necessitated by the appended claims.

I claim:

1. A programming system for pre-establishing the operating voltage for a work cycle of operation of a power supply unit which basically involves a main transformer having a secondary winding with a motor driven contact for connecting to said winding at selectable voltage levels thereon to determine the output voltage of said power supply unit, said programming system comprising means for pre-selecting the initial starting voltage of said work cycle, said means including said motor being adapted for forward and reverse rotation, means for connecting said motor for operation in the forward direction, said last means including a transformer winding, a pair of leads connecting said motor to said transformer winding for forward rotation, and a pair of normally closed contacts in one of said leads, means for connecting said motor to said transformer winding for reverse rotation, said means including a pair of leads and a pair of normally open contacts in one of said leads, relay means including said normally closed contacts and said normally open contacts, means for controlling the energization of said relay means to determine such forward and reverse operations of said motor as will bring said motor driven contact to a desired voltage connection with said main transformer secondary winding, and time controlled means for subsequently controlling the energization of said relay means at a predesired point in an operating cycle of said programming system, to determine such forward and reverse operations of said motor as will bring said motor driven contact to a different desired voltage connection with said main transformer secondary winding.

2. A programming system for pre-establishing the operating voltage sequence for a work cycle of operation of a power supply unit which basically involves a main transformer having a secondary winding with a motor driven contact for connecting to said winding at selectable voltage levels thereon to determine the output voltage of said power supply unit, said programming system comprising means for pre-selecting the initial starting voltage of said work cycle, said means including said motor having a forward winding and a reversing winding means for connecting said forward winding across a source of power to energize said motor for operation in the forward direction, said last means including a transformer winding, a pair of leads connecting said forward winding to said transformer winding, and a pair of normally closed contacts in one of said leads, means for connecting the reverse winding of said motor to a source of power to energize said motor for operation in the reverse direction, said means including a pair of leads and a pair of normally open contacts in one of said leads, a first relay including a relay winding and said normally closed contacts, a second relay including a relay winding and said normally open contacts, means for controlling the energization of said relays to bring said motor driven contact to a connection with said main transformer secondary winding giving a desired starting voltage, and time controlled means for subsequently controlling the energization of said relays at a pre-desired point in an operating cycle of said programming system, to bring said motor driven contact to a different connection with said main transformer secondary winding to provide a different output voltage of said power supply unit.

3. A programming system for pre-establishing the operating voltage sequence for a work cycle of operation of a power supply unit which basically involves a main transformer having a secondary winding with a motor driven contact for connecting to said winding at selectable voltage levels thereon to determine the output voltage of said power supply unit, said programming system comprising means for pre-selecting the initial starting voltage of said work cycle, said means including said motor having a forward winding and a reversing winding means for connecting said forward winding across a source of power to energize said motor for operation in the forward direction, said last means including a transformer winding, a pair of leads connecting said forward winding to said transformer winding, and a pair of normally closed contacts in one of said leads, means for connecting the reverse winding of said motor to a source of power to energize said motor for operation in the reverse direction, said means including a pair of leads and a pair of normally open contacts in one of said leads, a first relay including a relay winding and said normally closed contacts, a second relay including a relay winding and said normally open contacts, means connecting said relay windings in series, means for controlling the energization of said relays to bring said motor driven contact to a connection with said main transformer secondary winding giving a desired starting voltage, said means including an electro-mechanical relay having a winding, a plurality of individual contacts normally engaging a common contact, and mechanical means responsive to voltage developed across said winding for sequentially disengaging said individual contacts at a rate proportional to the prevailing voltage across said winding, said mechanical means including a cam shaped element of insulation material, mechanically referenced against an inertia damped spring, means normally shunting said first relay winding, said means including the second and fourth contacts of said electro-mechanical relay, means normally shunting said second relay winding, said means including the fourth contact and the common contact of said electro-mechanical relay, means for establishing operation of said electro-mechanical relay along a rate curve such as to enable energization of said motor for a time sufficient to bring said driven contact to a desired voltage before energizing said first relay and disconnecting said motor, said means including a lead connecting one side of said electro-mechanical relay winding to a fixed point on said main transformer secondary winding, a lead connecting the other side of said electro-mechanical relay winding to said motor driven contact, an adjustable resistor in one of said leads to enable adjustment of voltage appearing across said electro-mechanical relay winding with movement of said motor driven contact, and means for shifting operation of said electro-mechanical relay to any one of a different range of rate curves to establish a different operating voltage at a desired time in a work cycle, said means including a second adjustable resistor of a different value than said first adjustable resistor, adapted for connection in circuit with said electro-mechanical relay winding to enable a different adjustment of voltage appearing across said electro-mechanical relay winding, and time controlled means for inserting said second adjustable resistor in circuit with said electro-mechanical relay winding.

4. A programming system for pre-establishing the operating voltage sequence for a work cycle of operation of a power supply unit which basically involves a main transformer having a secondary winding with a motor driven contact for connecting to said winding at selectable voltage levels thereon to determine the output voltage of said power supply unit, said programming system comprising means for pre-selecting the initial starting voltage of said work cycle, said means including said motor having a forward winding and a reversing winding means for connecting said forward winding across a source of power to energize said motor for operation in the forward direction, said last means including an auxiliary transformer secondary winding, a pair of leads connecting said forward winding to said transformer secondary winding, and a pair of normally closed contacts in one of said leads, means for connecting the reverse winding of said motor to said auxiliary transformer secondary winding, said means including a pair of leads and a pair of normally open contacts in one of said leads, a first relay including a relay winding and said normally closed contacts, a second relay including a relay winding and said normally open contacts, means connecting said relay windings in series, means for controlling the energization of said relays to bring said motor driven contact to a connection with said main transformer secondary winding giving a desired starting voltage, said means including an electro-mechanical relay having a winding, a plurality of individual contacts normally engaging a common contact, and mechanical means responsive to voltage developed across said winding for sequentially disengaging said individual contacts at a rate proportional to the prevailing voltage across said winding, said mechanical means including a cam shaped element of insulation material, mechanically referenced against an inertia damped spring, means normally shunting said first relay winding, said means including the second and fourth contacts of said electro-mechanical relay, means normally shunting said second relay winding, said means including the fourth contact and the common contact of said electro-mechanical relay, means for establishing operation of said electro-mechanical relay along a rate curve such as to enable energization of said motor for a time sufficient to bring said driven contact to a desired voltage before energizing said first relay and disconnecting said motor, said means including a lead connecting one side of said electro-mechanical relay winding to a fixed point on said main transformer secondary winding, a lead connecting the other side of said electro-mechanical relay winding to said motor driven contact, an adjustable resistor in one of said leads to enable adjustment of voltage appearing across said electro-mechanical relay winding with movement of said motor driven contact, and means for electrically damping said electro-mechanical relay upon opening of the first contact and just prior to energization of said first relay with resulting opening of said motor circuit, and means for shifting operation of said electro-mechanical relay to any one of a different range of rate curves to establish a different operating voltage at a desired time in a work cycle, said means including a second adjustable resistor of a different value than said first adjustable resistor, adapted for connection in circuit with said electro-mechanical relay winding to enable a different range of adjustment of voltage appearing across said electro-mechanical relay winding, and time controlled means for inserting said second adjustable resistor in circuit with said electro-mechanical relay winding.

5. A voltage control system for controlling the operating voltage for a work cycle of operation of a power supply unit which basically involves a main transformer having a secondary winding with a motor driven contact for connecting to said winding at selectable voltage levels thereon to determine the output voltage of said power supply unit, said system comprising a motor being adapted for forward and reverse rotation, means for connecting said motor for operation in the forward direction, said last means including a transformer winding, a pair of leads connecting said motor to said transformer winding for forward rotation, and a pair of normally closed contacts in one of said leads, means for connecting said motor to said transformer winding for reverse rotation, said means including a pair of leads and a pair of normally open contacts in one of said leads, relay means including a pair of relay windings, one of said windings controlling said normally closed contacts and the other of said windings controlling said normally open contacts, means shunting said first relay winding, means shunting said second relay winding, and means for sequentially removing said shunts from said relay windings and for re-establishing the same in reverse order in accordance with the rise and fall of voltage at said motor driven contact.

6. A voltage control system for controlling the operating voltage for a work cycle of operation of a power supply unit which basically involves a main transformer having a secondary winding with a motor driven contact for connecting to said winding at selectable voltage levels thereon to determine the output voltage of said power supply unit, said system comprising a motor being adapted for forward and reverse rotation, means for connecting said motor for operation in the forward direction, said last means including a transformer winding, a pair of leads connecting said motor to said transformer winding for forward rotation, and a pair of normally closed contacts in one of said leads, means for connecting said motor to said transformer winding for reverse rotation, said means including a pair of leads and a pair of normally open contacts in one of said leads, relay means including a pair of windings, one of said windings controlling said normally closed contacts and the other of said windings controlling said normally open contacts, means shunting said first relay winding, means shunting said second relay winding, means for sequentially removing said shunts from said relay windings and for re-establishing the same in reverse order in accordance with the rise and fall of voltage at said motor driven contact, and means for altering the rate at which said shunts are removed and re-established for any change in voltage at said motor driven contact.

References Cited by the Examiner

UNITED STATES PATENTS

| | | | |
|---|---|---|---|
| 2,071,984 | 2/37 | Minneci | 323—43.5 |
| 2,216,595 | 10/40 | McCarty | 317—141 |
| 2,747,157 | 5/56 | Pinney | 323—43.5 |

LLOYD McCOLLUM, *Primary Examiner.*